US009796328B2

United States Patent
Kim et al.

(10) Patent No.: US 9,796,328 B2
(45) Date of Patent: Oct. 24, 2017

(54) METHOD AND SYSTEM FOR CORRECTING MISRECOGNIZED INFORMATION OF LANE

(71) Applicant: Hyundai Motor Company, Seoul (KR)

(72) Inventors: Jong Chul Kim, Gyeonggi-do (KR); Jeong Jae Yoo, Incheon (KR); Sung Min Ji, Gyeonggi-do (KR); Hyung Jun Lim, Gyeonggi-do (KR); Yon Jun Jang, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/214,036

(22) Filed: Jul. 19, 2016

(65) Prior Publication Data

US 2017/0120815 A1    May 4, 2017

(30) Foreign Application Priority Data

Oct. 28, 2015 (KR) .................. 10-2015-0150421

(51) Int. Cl.
*B60Q 9/00* (2006.01)
*G06K 9/00* (2006.01)

(52) U.S. Cl.
CPC ......... *B60Q 9/008* (2013.01); *G06K 9/00798* (2013.01); *G06K 9/00791* (2013.01); *G06K 9/00912* (2013.01)

(58) Field of Classification Search
CPC .......... G06K 9/00798; G06K 9/00791; G06K 9/00912
See application file for complete search history.

(56) References Cited

U.S. PATENT DOCUMENTS

| 5,223,907 | A | * | 6/1993 | Asayama | G01S 11/12 |
| | | | | | 348/118 |
| 5,307,419 | A | * | 4/1994 | Tsujino | G05D 1/0223 |
| | | | | | 348/119 |
| 5,517,412 | A | * | 5/1996 | Unoura | G05D 1/0246 |
| | | | | | 348/118 |
| 6,091,833 | A | * | 7/2000 | Yasui | G05D 1/0246 |
| | | | | | 348/118 |
| 6,493,458 | B2 | * | 12/2002 | Yasui | G05D 1/0246 |
| | | | | | 382/100 |

(Continued)

FOREIGN PATENT DOCUMENTS

| JP | 2007-309799 A | 11/2007 |
| JP | 2009-274497 A | 11/2009 |

(Continued)

OTHER PUBLICATIONS

Notice of Allowance dated May 26, 2017 in corresponding Korean Patent Application No. KR 10-2015-0150421.

*Primary Examiner* — Joseph Feild
*Assistant Examiner* — Rufus Point
(74) *Attorney, Agent, or Firm* — Mintz Levin Cohn Ferris Glovsky and Popeo, P.C.; Peter F. Corless

(57) ABSTRACT

A method and system for correcting misrecognized information of a lane are provided. The method includes extracting lane information of a vehicle information and guard rail information and extracting reference points from each of the lane information and the guard rail information. The reference points are then connected to extract linear lanes and a guard rail and areas and tilts of the lanes and the guard rail are compared to correct the lanes and the guard rail.

12 Claims, 7 Drawing Sheets

(56) References Cited

U.S. PATENT DOCUMENTS

| | | | | |
|---|---|---|---|---|
| 6,813,370 B1* | 11/2004 | Arai | ............ | G06T 7/593 340/908.1 |
| 2002/0031242 A1* | 3/2002 | Yasui | ............ | G05D 1/0246 382/104 |
| 2008/0317288 A1* | 12/2008 | Aoki | ............ | G06K 9/00798 382/104 |
| 2009/0085913 A1* | 4/2009 | Sakamoto | ............ | G06K 9/00798 345/420 |
| 2010/0295668 A1* | 11/2010 | Kataoka | ............ | B62D 15/025 340/435 |
| 2012/0069185 A1* | 3/2012 | Stein | ............ | G06K 9/00798 348/148 |
| 2013/0184976 A1* | 7/2013 | Akiyama | ............ | G06F 17/00 701/116 |
| 2015/0063648 A1 | 3/2015 | Minemura et al. | | |
| 2015/0165972 A1 | 6/2015 | Takemae et al. | | |
| 2016/0046290 A1* | 2/2016 | Aharony | ............ | G06K 9/00798 701/41 |

FOREIGN PATENT DOCUMENTS

| | | |
|---|---|---|
| JP | 2010-020710 | 1/2010 |
| JP | 2010-271999 A | 12/2010 |
| JP | 2012-128748 A | 7/2012 |
| JP | 2014-002608 A | 1/2014 |
| JP | 2015-045622 A | 3/2015 |
| KR | 2014-0030753 A | 3/2014 |
| KR | 10-2014-0074105 | 6/2014 |
| WO | 2012/042339 A1 | 4/2012 |

\* cited by examiner

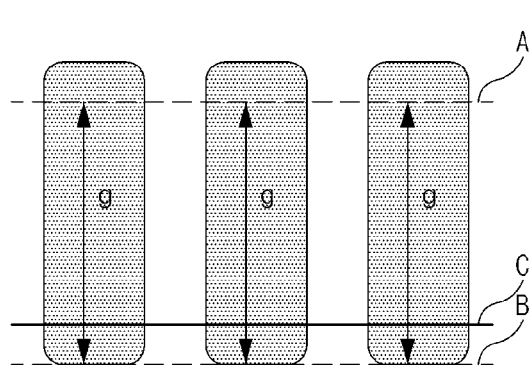
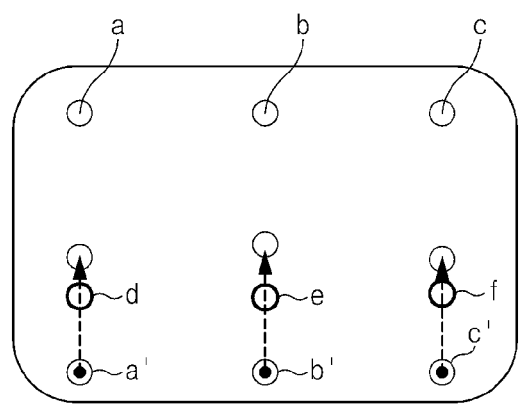
FIG. 1A                    FIG. 1B

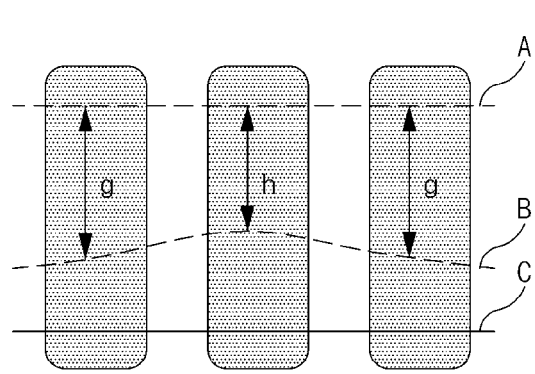
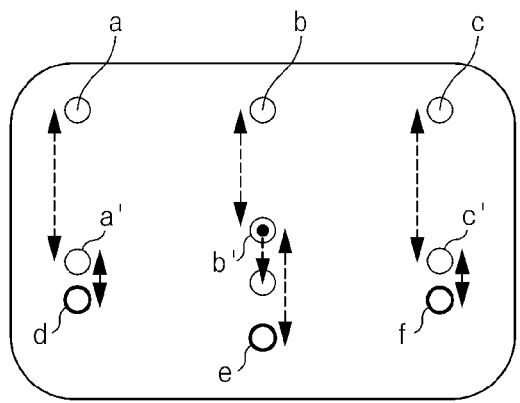
FIG. 3A
FIG. 3B

METHOD AND SYSTEM FOR CORRECTING MISRECOGNIZED INFORMATION OF LANE

CROSS-REFERENCE TO RELATED APPLICATION

This application is based on and claims the benefit of priority to Korean Patent Application No. 10-2015-0150421, filed on Oct. 28, 2015, in the Korean Intellectual Property Office, the disclosure of which is incorporated herein in its entirety by reference.

TECHNICAL FIELD

The present disclosure relates to a method and system for correcting misrecognized information of a lane, and more particularly, to a technique of correcting misrecognized information of a lane using horizontal directional information of a guard rail.

BACKGROUND

Recently, to promote safety when a vehicle is being driven, a lane departure warning system (LDWS) configured to detect a lane using an imaging device (e.g., a camera, video camera, etc.) installed within a vehicle and configured to output an alarm to a driver as necessary has been installed in vehicles. The LDWS may be classified as a scheme using an imaging device positioned near an inside mirror, a scheme using a rear imaging device, and a scheme using a photo sensor installed in a lower portion of a vehicle according to installation positions of the imaging device used in the LDWS.

One problematic issue, however, in relation to the LDWS is how a lane is accurately recognized from an image obtained from the imaging device. For example, there is a possibility in which information of a lane may be distorted due to a guard rail positioned adjacent to a lane while the vehicle is being driven, or a shadow of the guard rail, and it may be difficult to distinguish between the lane and the guard rail from an image obtained by the imaging device.

SUMMARY

The present disclosure provides a method and system for correcting a misrecognized information of a lane, as a technique of correcting misrecognized information of a lane using transverse information of a guard rail, capable of performing correction such that, when a space between lanes is recognized to be greater than a guard rail, the inner lane may be maintained to have a minimum distance to a recognized point of the guard rail and maintains an average point of a distance between the lanes, when a space between the lanes is recognized to be less than a predetermined distance, the inner lane maintains a minimum distance to the recognized point of the guard rail, when a partial section of a space between the lanes is recognized to be narrow, the inner lane maintains a minimum distance to the recognized point of the guard rail, and when a partial section of the space between the lanes is recognized to be greater than a predetermined distance, the inner lane maintains a minimum distance to the recognized point of the guard rail and an average point of the distance between the lanes is maintained.

Technical subjects of the present disclosure are not limited to the foregoing technical subjects and any other technical subjects not mentioned will be understood from the following descriptions and become apparent by exemplary embodiments of the present disclosure. Also, it may be easily understood that the advantages, features and aspects of the present disclosure may be realized by means and combinations demonstrated in claims.

According to an exemplary embodiment of the present disclosure, a method for correcting misrecognized information of a lane may include: extracting lane information of a vehicle information and guard rail information; extracting reference points from each of the lane information and the guard rail information; connecting the reference points to extract linear lanes and a guard rail; comparing areas and tilts of the lanes and the guard rail; and correcting the lanes and the guard rail.

The comparison of the areas and tilts of the lanes and the guard rail may include determining whether the areas and tilts of the lanes and the guard rail are within a set parameter value. Additionally, the comparison of the areas and tilts of the lanes and the guard rail may include: comparing the areas between the lanes and the area between the lane and the guard rail; and comparing the tilt between the lanes and the tilt between the lane and the guard rail. The linear line may be formed by connecting a plurality of linear lines.

In the extraction of the linear lanes and the guard rail, at least two reference points may be required to form the lane or the guard rail, a difference value in position between remaining reference points and the linear line may be determined using a linear line passing through one reference point, and when the difference value is less than a set parameter value, one linear line may be extracted, and when the difference value is greater than the set parameter value, a plurality of linear lines may be extracted.

BRIEF DESCRIPTION OF THE DRAWINGS

The above and other objects, features and advantages of the present disclosure will be more apparent from the following detailed description taken in conjunction with the accompanying drawings.

FIGS. 1A through 4B are views illustrating a method for correcting misrecognized information of a lane and a guard rail according to an exemplary embodiment of the present disclosure;

DETAILED DESCRIPTION

Figure 2A:
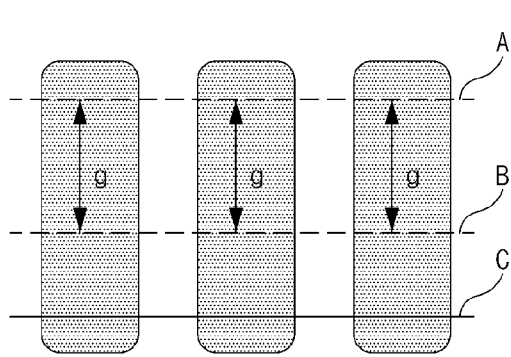
Figure 2B:
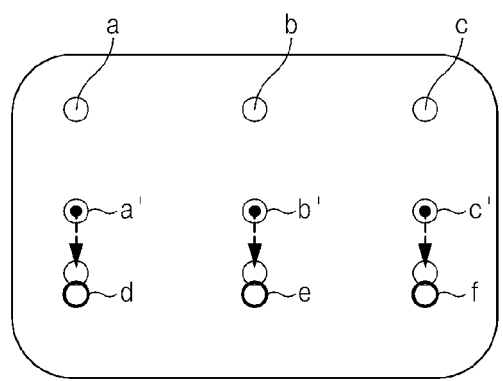
Figure 4A:
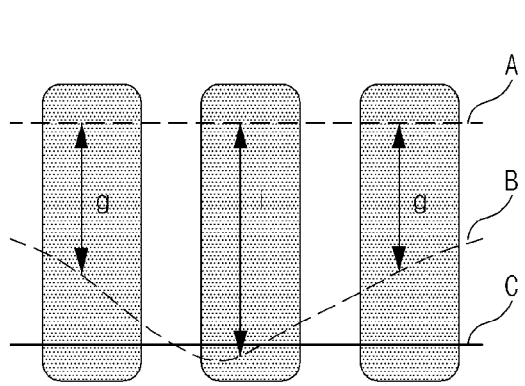
Figure 4B:
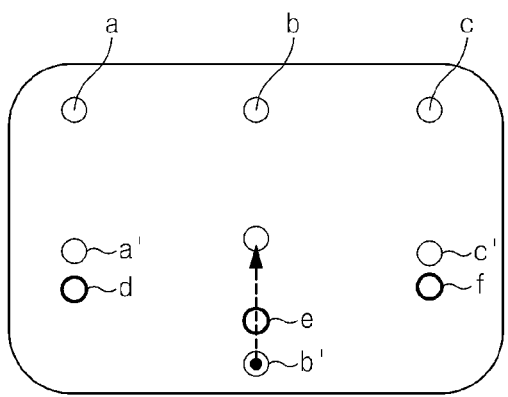

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Advantages and features of the present disclosure, and implementation methods thereof will be described through exemplary embodiments described with reference to the accompanying drawings. The present disclosure may, however, be embodied in different forms and should not be construed as limited to the embodiments set forth herein. Rather, these exemplary embodiments are provided to describe the present disclosure so that a technical concept of the present disclosure may be easily practiced by those skilled in the art to which the present disclosure pertains.

In the drawings, the exemplary embodiments of the present disclosure are not limited to a specific form and are exaggerated for clarity. The specific terms used in the present disclosure are merely used to describe the present disclosure, and are not intended to limit the scope of the present disclosure described in claims. In the present disclosure, terms "connected/coupled" include a direct connection with other component or an indirect connection through other component.

Hereinafter, exemplary embodiment of the present disclosure will be described in detail with reference to the accompanying drawings.

A system for correcting misrecognized information of a lane may include a controller disposed within a vehicle and, in a first lane A, a second lane B, and a guard rail C, the controller may be configured to adjust reference points a, b, and c corresponding to the first land A, reference points a', b', and c' corresponding to a second lane B, reference points d, e, and f corresponding to the guard rail C, and a distance g between the first lane A and the second land B. The purpose of correcting misrecognized information of a lane is to provide more accurate information when a lane keeping assist system (LKAS) disposed within a vehicle operates a vehicle using lane information and guard rail information or outputs an alarm or notification to a driver.

FIGS. 1A through 4B are views illustrating a method for correcting misrecognized information of a lane and a guard rail according to an exemplary embodiment of the present disclosure. Referring to 1A and 1B, when a guard rail C is disposed between the first lane A and the second lane B, a system for correcting misrecognized information of a lane may be configured to correct reference points a', b', and c' corresponding to the second lane B to position the reference points a', b', and c' between the first lane A and the guard rail C to maintain a minimum distance between the reference points a', b', and c' corresponding to the second lane B and the reference points d, e, and f corresponding to the guard rail C and to maintain an average value between the first lane A and the second lane B. In particular, the first lane may be defined as an outer lane, the second lane may be defined as an inner lane, and a third lane may be defined as the guard rail.

Referring to 2A and 2B, when the guard rail C is provided to maintain a predetermined distance at an outer side of the first lane A and the second lane B, the system for correcting misrecognized information of a lane may be configured to execute correction such that the reference points a', b', and c' corresponding to the second lane B maintain a minimum distance to the reference points d, e, and f corresponding to the guard rail C.

Referring to 3A and 3B, when the guard rail C is maintained at a predetermined distance outside of the first lane A or the second lane B and a partial section of the second lane B has a shorter distance h with respect to the first lane A, the system for correcting misrecognized information of a lane may be configured to perform correction such that the reference points a', b', and c' corresponding to the second lane B maintain a minimum distance to the reference points d, e, and f corresponding to the guard rail C.

Referring to 4A and 4B, when the guard rail C is maintained at a predetermined distance outside of the first lane A or the second lane B and a partial section of the second lane B has a greater distance i from the first lane A, the system for correcting misrecognized information of a lane may be configured to perform correction such that the partial section of the second lane B is positioned between the first lane A and the guard rail C for the reference points a', b', and c' corresponding to the second lane B to maintain a minimum distance to the reference points d, e, and f corresponding to the guard rail C and to maintain an average value of a distance g between the first lane A and the second lane B.

Figure 5:
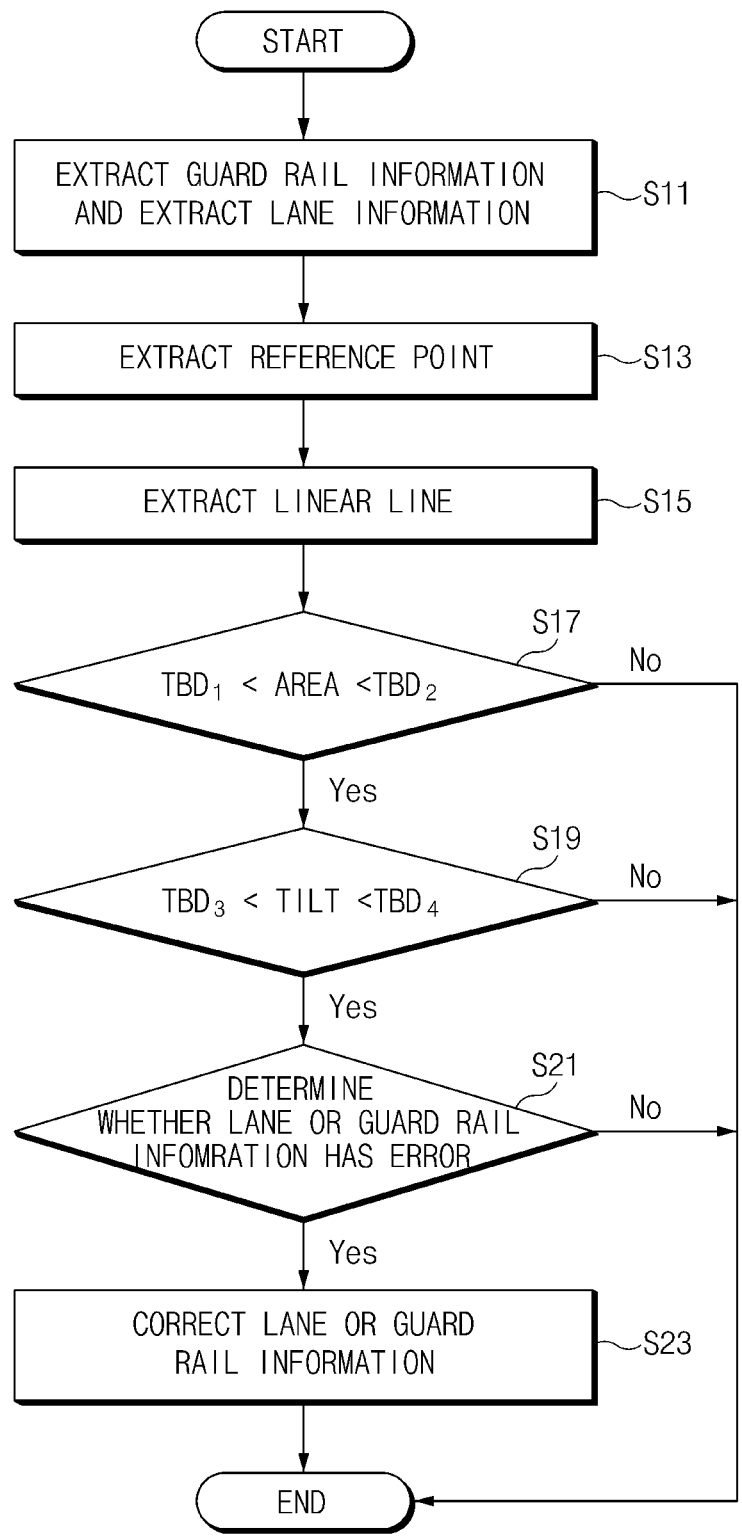
FIG. 5 is a flow chart illustrating a method for correcting misrecognized information of a lane according to an exemplary embodiment of the present disclosure.

FIG. 5 is a flow chart illustrating a method for correcting misrecognized information of a lane according to an exemplary embodiment of the present disclosure. Referring to FIG. 5, first, the system for correcting misrecognized information of a lane may be configured to extract lane information and guard rail information using an imaging device, a sensor, or various detection devices of the vehicle in operation S11. In other words, the imaging device may be configured to capture an image from which lane information and guard rail information may be extracted. Alternatively, a sensor may be configured to detect positions of road lanes and guard rails.

Further, the system may be configured to extract a reference point from each of the lane information and guard rail information in operation S13. For example, the system may be configured to detect a first reference point a, a second reference point b, and a third reference point c to recognize a first lane from first lane information. Such reference points may be modified to various numbers. Additionally, the system may be configured to recognize a first reference point d, a second reference point e, and a third reference point f to recognize a guard rail from guard rail information. Thereafter, the system may connect the reference points to extract a linear line for forming a lane and a guard rail in operation S15.

Figures 6A, 6B:
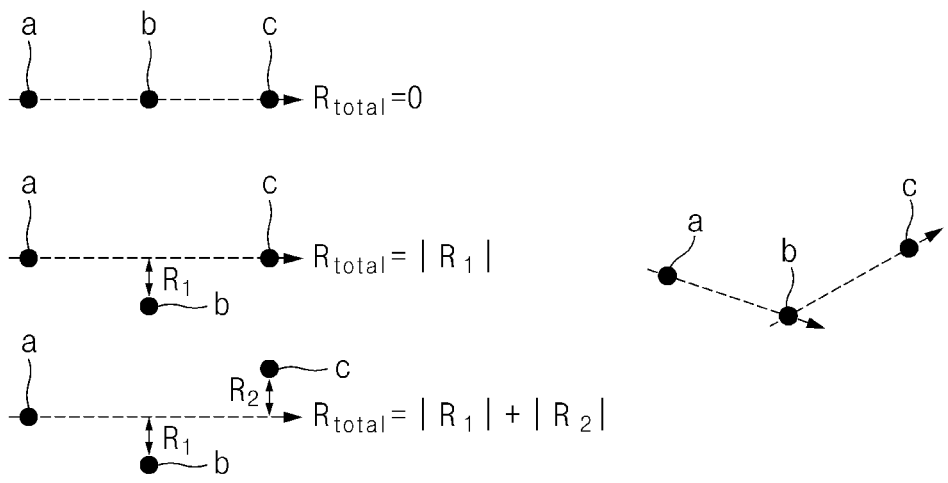
FIGS. 6A and 6B are views illustrating a method for extracting a linear line from lane or guard rail information according to an exemplary embodiment of the present disclosure.

Particularly, a method for extracting a linear line for forming a lane or a guard rail will be described hereinafter (please refer to FIGS. 6A and 6B). The method may be executed by a controller having a processor and a memory mounted within the vehicle. For example, to extract a linear line by connecting three reference points a, b, and c, at least two reference points are required, and to extract a linear line passing through the three reference points a, b, and c, two reference points may be connected or a difference value in position between one reference and the other reference points based on the one reference point (e.g., a distance or a space from a virtual linear line connecting the one reference point to the other reference points, R1 or R1+R2) may be determined. When the difference value is less than a set parameter value (or to-be-determined (TBD) parameter value), one linear line may be maintained. The set parameter value may be adjusted by a driver based on a space between lanes or a space between a lane and a guard rail.

However, when a difference value in position between two reference points or one reference point and the other remaining reference point is greater than the set parameter value, two separated linear lines may be formed. Further, after a first linear line for forming a first lane, a second linear line for forming a second lane, and a third linear line for forming a guard rail are formed, similarities of the linear lines may be determined in operations S17 to S19. In particular, to determine the similarities of the linear lines, an area and a tilt between the linear lines may be used. In other words, similarities between the linear lines may be determined by comparing an area between the first linear line and the third linear line with an area between the first linear line and a fifth linear line (guard rail). In addition, similarities between the linear lines may be determined by comparing tilts of the first linear line and the third linear line with tilts of the first linear line and the fifth linear line (guard rail).

Figure 7:
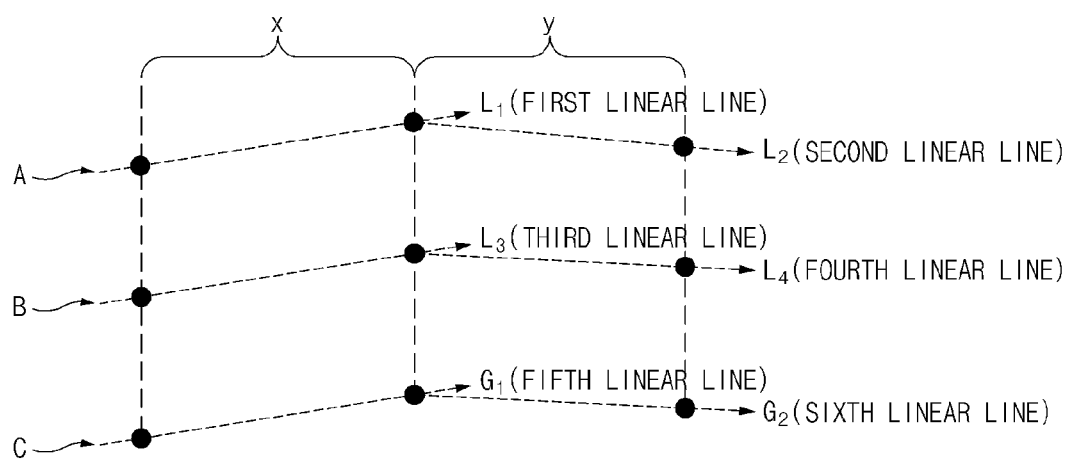
FIG. 7 is a view illustrating a method for determining similarity between linear lines extracted from lane or guard rail information according to an exemplary embodiment of the present disclosure.

The similarities between the linear lines may be determined to compare the area between the first linear line and the third linear line and the area between the first linear line and the fifth linear line and the tilts thereof and to determine whether to perform correction based on spaces or distances between the first linear line, the third linear line, and the fifth linear line. In particular, a method for determining similarity between linear lines for forming a lane or a guard rail will be described as follows in reference to FIG. 7.

A structure in which the first lane A, the second lane B, and the guard rail C are each connected by two linear lines will be described. The first linear line for forming a lane may be denoted by L1, the second linear line may be denoted by L2, the third linear line may be denoted by L4, and the fifth linear line for forming the guard rail may be denoted by G1, and the sixth linear line may be denoted by G2. For example, an area of a first section X between the first lane A and the second lane B and an area of the first section X between the first lane A and the guard rail C may be compared. When the areas are within the parameter (TBD) value, the linear lines may be determined as having similar areas. The set parameter (TBD) value may be indicated as a range (TBD1 to TBD2) of the set parameter (TBD) value.

Additionally, a tilt (e.g., a tilt angle) of the first linear line L1 and a tilt of the third linear line L3, and a tilt of the first linear line L1 and a tilt of the fifth linear line G1 may be calculated and compared. When the tilts are within a set parameter (TBD) value, the linear lines may be determined as having similar tilts. The set parameter (TBD) value may be indicated as a range (TBD3 to TBD4) of the set parameter (TBD) value. Thereafter, similarities of the linear lines may be determined, and when the areas and tilts of the linear lines are within the set parameter value, the linear lines may be compared based on areas and tilts thereof. However, even though the linear lines may have similar areas and tilts, since lane or guard rail information may be determined to include misrecognized information of the lane or the guard rail in a space between the first lane A and the second lane B or in a space between the second lane B and the guard rail C, the misrecognized lane or guard rail information may be corrected in operations S21 to S23.

As described above, in the exemplary embodiments of the present disclosure, a situation in which a lane is misrecognized due to a guard rail may be eliminated. Additionally, transverse information regarding a lane or a guard rail may be corrected using lane information or guard rail information. In other words, the corrected information regarding the lane and guard rail may be used by a lane departure warning system to operate the vehicle more accurately or to provide a warning notification to a driver when a lane departure risk is detected. Thus, risks of potential collisions due to misrecognized information may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for correcting misrecognized information of a lane, comprising:
   extracting, by a processor, lane information of a vehicle information and guard rail information;
   extracting, by the processor, reference points from each of the lane information and the guard rail information;
   connecting, by the processor, the reference points to extract linear lanes and a guard rail;
   comparing, by the processor, areas and tilts of the lanes and the guard rail;
   correcting, by the processor, the lanes and the guard rail; and
   transmitting, by the processor, the corrected lanes and guard rail to a lane departure warning system.

2. The method according to claim 1, wherein the comparing of the areas and tilts of the lanes and the guard rail includes:
   determining, by the processor, whether the areas and tilts of the lanes and the guard rail are within a set parameter value.

3. The method according to claim 1, wherein the comparing of the areas and tilts of the lanes and the guard rail includes:
   comparing, by the processor, the areas between the lanes and the area between the lane and the guard rail; and
   comparing, by the processor, the tilt between the lanes and the tilt between the lane and the guard rail.

4. The method according to claim 1, wherein the linear line is formed by connecting a plurality of linear lines.

5. The method according to claim 1, wherein, in the extracting of the linear lanes and the guard rail, at least two reference points are required to form the lane or the guard rail, a difference value in position between remaining reference points and the linear line is determined using a linear line passing through one reference point, and when the difference value is less than a set parameter value, one linear line is extracted, and when the difference value is greater than the set parameter value, a plurality of linear lines are extracted.

6. A system for correcting misrecognized information of a lane, comprising:
   a memory configured to store program instructions; and
   a processor configured to execute the program instructions, the program instructions when executed configured to:
      extract lane information of a vehicle information and guard rail information;
      extract reference points from each of the lane information and the guard rail information;
      connect the reference points to extract linear lanes and a guard rail;
      compare areas and tilts of the lanes and the guard rail;
      correct the lanes and the guard rail; and
      transmit the corrected lanes and guard rail to a lane departure warning system.

7. The system according to claim 6, wherein the program instructions when executed to compare of the areas and tilts of the lanes and the guard rail include program instructed when executed configured to:
   determine whether the areas and tilts of the lanes and the guard rail are within a set parameter value.

8. The system according to claim 6, wherein the program instructions when executed that compare of the areas and tilts of the lanes and the guard rail include program instruction when executed configured to:
   compare the areas between the lanes and the area between the lane and the guard rail; and
   compare the tilt between the lanes and the tilt between the lane and the guard rail.

9. The system according to claim 6, wherein the linear line is formed by connecting a plurality of linear lines.

10. A non-transitory computer readable medium containing program instructions executed by a processor, the computer readable medium comprising:
    program instructions that extract lane information of a vehicle information and guard rail information;
    program instructions that extract reference points from each of the lane information and the guard rail information;
    program instructions that connect the reference points to extract linear lanes and a guard rail;
    program instructions that compare areas and tilts of the lanes and the guard rail;
    program instructions that correct the lanes and the guard rail; and
    program instructions that transmit the corrected lanes and guard rail to a lane departure warning system.

11. The non-transitory computer readable medium of claim 10, further comprising:
    program instructions that determine whether the areas and tilts of the lanes and the guard rail are within a set parameter value.

12. The non-transitory computer readable medium of claim 10, further comprising:
    program instructions that compare the areas between the lanes and the area between the lane and the guard rail; and
    program instructions that compare the tilt between the lanes and the tilt between the lane and the guard rail.

* * * * *